L. G. SHRYOCK.
STEREOPTICON SLIDE CARRIER.
APPLICATION FILED OCT. 19, 1920.
1,414,488.
Patented May 2, 1922.
3 SHEETS—SHEET 1.
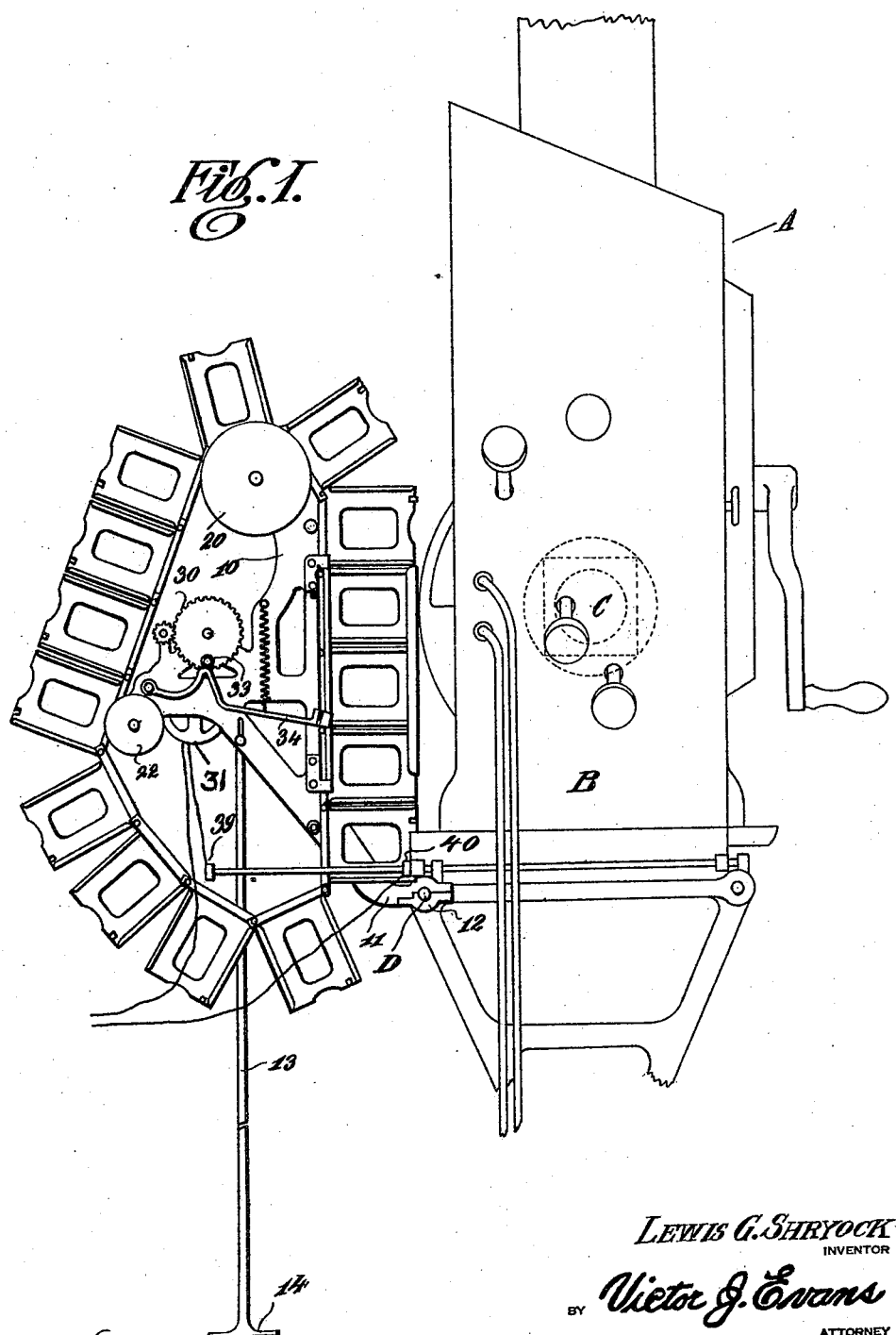

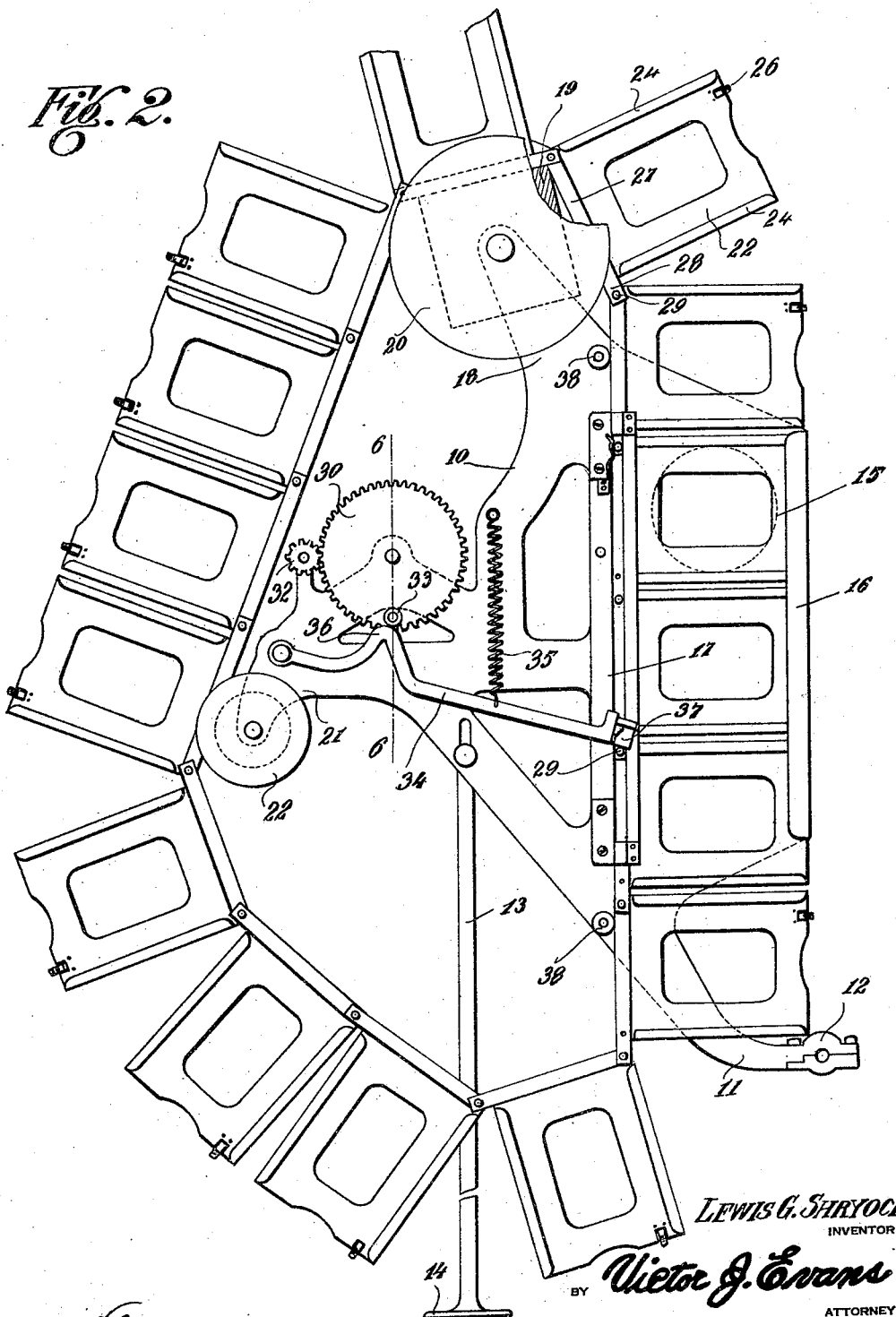

L. G. SHRYOCK.
STEREOPTICON SLIDE CARRIER.
APPLICATION FILED OCT. 19, 1920.
1,414,488.
Patented May 2, 1922.
3 SHEETS—SHEET 3.
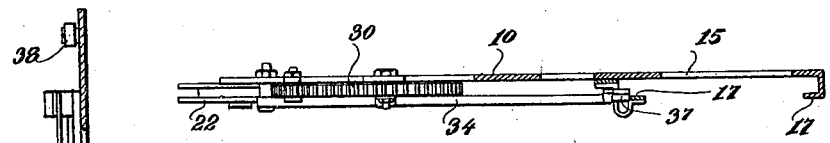
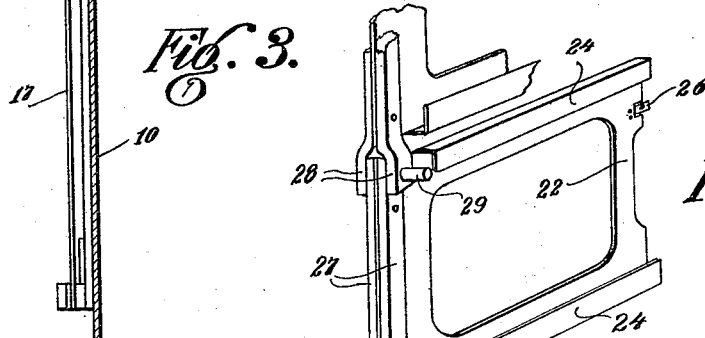
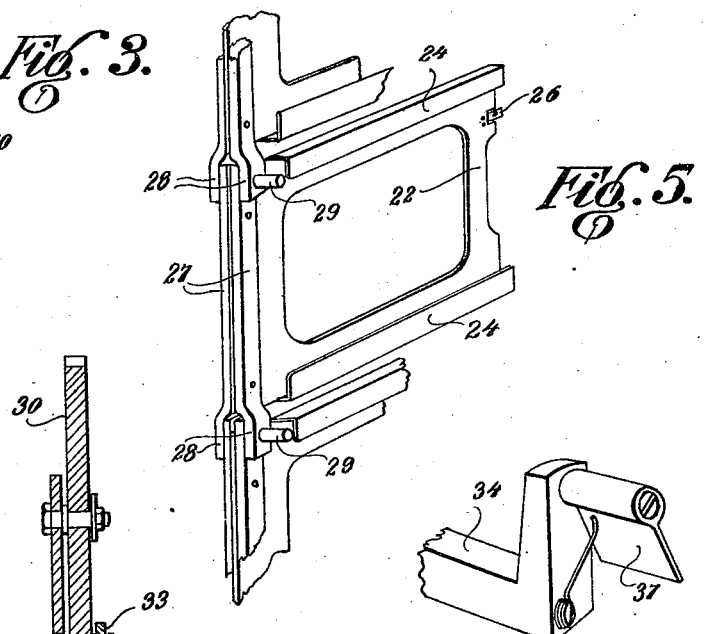
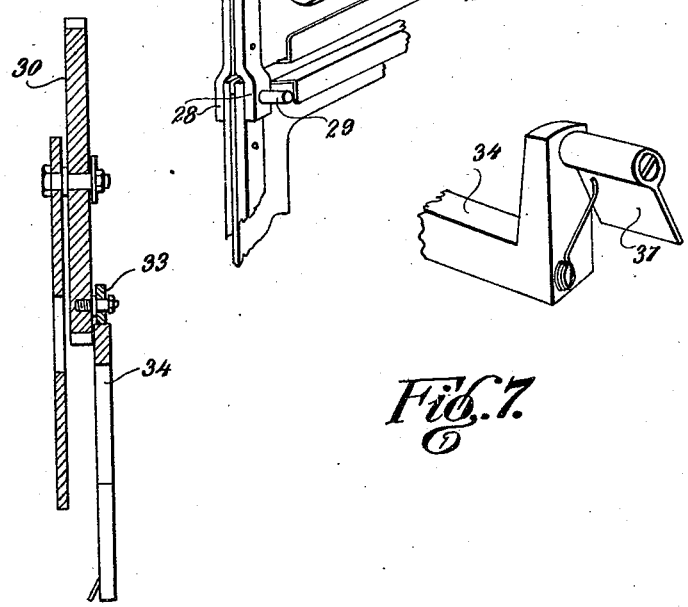
Lewis G. Shryock
INVENTOR
BY Victor J. Evans
ATTORNEY
WITNESS:

UNITED STATES PATENT OFFICE.

LEWIS G. SHRYOCK, OF CLARENDON, ARKANSAS.

STEREOPTICON-SLIDE CARRIER.

1,414,488.  Specification of Letters Patent.  Patented May 2, 1922.

Application filed October 19, 1920. Serial No. 417,985.

*To all whom it may concern:*

Be it known that I, LEWIS G. SHRYOCK, a citizen of the United States, residing at Clarendon, in the county of Monroe and State of Arkansas, have invented new and useful Improvements in Stereopticon-Slide Carriers, of which the following is a specification.

This invention relates to attachment for motion picture projection machines and has for its object the provision of a device for carrying and successively displaying or rather successively bringing stereopticon slides in front of the condenser lens of the machine automatically and without any attention whatever on the part of the operator, whereby the operator will be given an opportunity to make the necessary minor repairs or adjustments preparatory to running the next reel of film without necessitating any waiting or interruption.

An important object is the provision of a device of this character in which all the slides are mounted in separate carriers which are connected to form an endless chain, this chain being moved by a suitable motor to bring the successive slides before the condenser lens.

Another object is the provision of a device of this character having a novel motor driven means for moving the slide carriers step by step so that the matter thereon will be thrown on the screen for the desired length of time.

Another object is the provision of a device of this character which has a switch mechanism associated therewith and automatically closed when the lamp house of the projection machine is shifted to project the stereopticon views.

An additional object is the provision of a device of this character which will be comparatively simple and inexpensive in construction, which will be a great time and labor saver for the operator, which will eliminate objectionable waiting by the spectators while different adjustments and manipulations are gone through with by the operator while the slides are placed in and removed from operative position in the ordinary manner, the device having the further advantage of leaving the operator free to attend to other matters.

With the above and other objects and advantages in view, the invention consists in the details of construction to be hereinafter more fully described and claimed and illustrated in the accompanying drawings in which—

Figure 1 is an elevation of a portion of a motion picture projection machine showing my device in position thereon, Figure 2 is an enlarged elevation of my device detached, Figure 3 is a detail sectional view taken longitudinally of the guides, Figure 4 is a cross sectional view through the guides, Figure 5 is a detail perspective view of one of the slide carriers and portions of the adjacent slide carriers, Figure 6 is a detail sectional view on the line 6—6 of Figure 2, Figure 7 is a detail perspective view of the operating end of the actuating lever.

Referring more particularly to the drawings, the letter A designates a motion picture projection machine in general, B designates the lamp house thereof, and C designates the condenser lens. The machine of course includes among many other parts the rod D.

In carrying out my invention I provide a frame 10 provided with an arm 11 which carries at its end a clamp 12 engageable upon the rod D for connecting the device with a machine. Secured to the frame 10 is a supporting post 13 having its lower end 14 adapted to be secured upon the floor to serve as a brace. This frame, when properly positioned upon the machine, will be in such position that a hole 15 in the frame will register with the condenser lens C. The portion of the frame at the hole 15 is comparatively long and is formed at its edge with a retaining flange 16. At a point spaced back from the edge the frame is provided with an offset slotted guide 17, for a purpose to be described. At the upper portion of the frame is formed an arm 18 upon which is journaled a guide roller 19 square in cross section and having flanges 20. At the rear portion of the frame is formed an extension 21 upon which is journaled a flanged guide roller 22.

The numeral 23 designates one of the slide carriers which is formed of sheet metal having retaining flanges 24 at its side edges and having a retaining spring 26 at one end for holding a slide against displacement. At its other end is provided a reinforcement consisting of strips 27 secured together and offset outwardly at one end to provide spaced ears 28. The slide carriers are arranged with the strips 27 at one end disposed between the ears 28 of the next successive carrier, as clearly shown, and the carriers are pivotally connected by pins 29 which extend outwardly beyond the carrier, as clearly indicated, for engagement with the slotted guide 17. When all the carriers are connected they, with the strips 27, form an endless chain and it is readily apparent that the number of carriers used may vary considerably. The chain formed of the carriers is trained about the roller 19 and the roller 22 with the pins 29 of several adjacent carriers is disposed within the slotted guide 17 and the free ends engaged by the flange 16.

In order to effect movement of the chain of carriers I provide a gear 30 journaled on the extension 21 and driven by a motor 31 through a train of gears 32. Carried by the gear 30 near the edge thereof is a small roller 33. Pivoted upon the extension 21 is a lever arm 34 urged toward the gear 30 by a coil spring 35 and formed with a projection 36 in the path of travel of the roller 33. At its free end the arm 34 carries a spring-pressed pawl 37 which is engageable with the successive pins 29 of the carriers for moving them step by step. It is of course to be understood that the motor 31 must operate at such a speed that each slide will remain before the opening 15 the desired length of time before it is moved by the lever 34. It should be stated that other guide rollers 38 may be provided adjacent the ends of the guide 17 to insure proper movement of the carriers.

The device is associated with a motion picture machine in the following manner:

The screws holding the condenser hood on the lamp house of the motion picture machine are removed and the hood is connected to the lamp house at the operator's side thereof, leaving a sufficiently wide space between the hood and the lamp house for a portion of the upper free corner of each slide carrier to pass. The frame 10 is then bolted onto the rod D by means of the clamp 12 and the rod 13 is secured to the floor, any suitable adjustment being provided at the point of connection of the rod 13 with the frame. It is preferable to provide a contact 39 on the slide rod of the lamp house and another contact 40 on the lamp house, these contacts being connected in circuit with a suitable source of current to the motor 31 so that when the operator pushes the lamp house over to the stereopticon side of the motion picture machine, that is the side at which my device is located, the two contacts will engage and complete the circuit so that the motor will be immediately set in operation.

As the motor rotates the gear 30 will rotate and once in every rotation of the latter the roller 33 will engage and force down the lever arm 34, the pawl on which will engage a pin 29 and move the carrier chain one step. Whichever slide is then before the opening 15 will be projected until the gear 30 completes another rotation whereupon the lever arm 34 will operate to move the carrier chain another step, as will be readily apparent. As the roller 33 passes over the projection 36 the spring 35 will return the lever to initial position, the pawl 37 riding idly over the pin of the next carrier on the upstroke.

From the foregoing description and a study of the drawings it will be apparent that I have thus provided a simply constructed and automatically operated device for holding and causing to be projected any desired number, within reasonable limits, of stereopticon slides, the device being particularly advantageous in projecting advertising matter of all kinds onto the screen and at the same time requiring no attention on the part of the operator so that he will be free to prepare for running the next roll of film.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A motion picture machine attachment comprising a frame, guide rods carried by the motion picture machine and slidably supporting said frame, guide rollers on said frame, a plurality of slide carriers connected in endless chain formation and trained about said rollers, electric motor operating means for driving said chain step by step, a contact element carried by said guide rod, a second contact member carried by the frame, said contact being interposed in circuit with a source of current and with said electric motor, whereby when said frame is shifted to bring the slide carriers in registration with the condenser lens of the motion picture machine the engagement of said contact will cause completion of the circuit for energizing the motor.

2. A device of the character described comprising a supporting frame adapted for connection with a projection apparatus, guides on said frame, guide rollers on said frame, a plurality of slide carriers connected in endless chain formation and trained about said rollers and engaged within said guides, a projection on each carrier, and motor driven means successively engaging said projections whereby to move the carriers step by step, said means comprising a lever arm pivoted upon the frame and carrying a pawl at its free end engageable with the successive projections, and means for intermittently moving said lever arm comprising a rotary member, a roller on said rotary member, and a projection on said lever arm engageable by said roller.

3. In a device of the character described, a slide carrier of endless chain formation comprising a plurality of units each formed as a body having its side edges formed with retaining flanges and one end provided with a slide retaining clip, reinforcing strips at the other end of the body, one end of the strips being outwardly offset to define spaced ears receiving the ends of the strips of the next adjacent carrier, and pivot pins passing through said ears and through the strips of the adjacent carrier.

4. In a device of the character described, a slide carrier of endless chain formation comprising a plurality of units each formed as a body having its side edges formed with retaining flanges and one end provided with a slide retaining clip, reinforcing strips at the other end of the body, one end of the strips being outwardly offset to define spaced ears receiving the ends of the strips of the next adjacent carrier, pivot pins passing through said ears and through the strips of the adjacent carrier, means for guidably supporting said chain of carriers, and means for moving the carriers step by step.

In testimony whereof I affix my signature.

LEWIS G. SHRYOCK.